United States Patent
Serizawa et al.

(10) Patent No.: US 10,591,644 B2
(45) Date of Patent: *Mar. 17, 2020

(54) OPTICAL LAMINATE, POLARIZER, AND DISPLAY APPARATUS

(71) Applicant: TOPPAN TOMOEGAWA OPTICAL FILMS CO., LTD., Taito-ku, Tokyo (JP)

(72) Inventors: Naoki Serizawa, Tokyo (JP); Takayuki Nakanishi, Tokyo (JP)

(73) Assignee: TOPPAN TOMOEGAWA OPTICAL FILMS CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/058,891

(22) Filed: Aug. 8, 2018

(65) Prior Publication Data

US 2018/0348408 A1 Dec. 6, 2018

Related U.S. Application Data

(63) Continuation of application No. PCT/JP2017/005308, filed on Feb. 14, 2017.

(30) Foreign Application Priority Data

Feb. 16, 2016 (JP) .................. 2016-027340

(51) Int. Cl.
*G02B 1/111* (2015.01)
*G02B 1/16* (2015.01)
(Continued)

(52) U.S. Cl.
CPC ................ *G02B 1/111* (2013.01); *B32B 3/30* (2013.01); *B32B 7/02* (2013.01); *B32B 27/20* (2013.01);
(Continued)

(58) Field of Classification Search
CPC ........ G02B 1/111; G02B 5/3041; G02B 5/30; G02B 1/18; G02B 1/16; G02B 5/02;
(Continued)

(56) References Cited

U.S. PATENT DOCUMENTS

| 2003/0100656 A1 | 5/2003 | Majumdar et al. |
| 2004/0110884 A1 | 6/2004 | Dontula et al. |
| 2007/0207307 A1 | 9/2007 | Yoneyama et al. |
| 2008/0137206 A1 | 6/2008 | Nakamura et al. |

(Continued)

FOREIGN PATENT DOCUMENTS

| CN | 101128753 A | 2/2008 |
| JP | 2005-300576 A | 10/2005 |

(Continued)

*Primary Examiner* — Nathan L Van Sell
(74) *Attorney, Agent, or Firm* — Squire Patton Boggs (US) LLP

(57) ABSTRACT

An optical laminate includes a translucent substrate, and at least one optical functional layer provided on the translucent substrate. The optical functional layer has a concave-convex shape on at least one surface. The optical functional layer contains two types of inorganic fine particles, and resin particles. The optical laminate has an internal haze X and a total haze Y satisfying (1) Y>X, (2) Y≤X+25, (3) Y≤50, and (4) 7≤X≤25. The optical laminate has a transmitted image clarity of 15% to 55% as measured using a 0.5-mm width optical comb. The number of projections having a height of not smaller than 0.1 μm is not less than 900 per mm² of measurement area in the concave-convex shape as measured by optical interferometry at an outermost surface of the optical functional layer.

9 Claims, 3 Drawing Sheets

(51) Int. Cl.
*G02B 1/18* (2015.01)
*B32B 3/30* (2006.01)
*G02B 5/30* (2006.01)
*B32B 27/20* (2006.01)
*G02F 1/1335* (2006.01)
*B32B 7/02* (2019.01)
*G02B 5/02* (2006.01)
*G09F 9/00* (2006.01)

(52) U.S. Cl.
CPC ............... *G02B 1/16* (2015.01); *G02B 1/18* (2015.01); *G02B 5/02* (2013.01); *G02B 5/30* (2013.01); *G02B 5/305* (2013.01); *G02B 5/3041* (2013.01); *G02F 1/1335* (2013.01); *G09F 9/00* (2013.01); *G02F 1/133502* (2013.01); *G02F 1/133504* (2013.01); *G02F 1/133528* (2013.01)

(58) Field of Classification Search
CPC .. B32B 7/02; B32B 3/30; B32B 27/20; G09F 9/00; G02F 1/1335; G02F 1/133528
See application file for complete search history.

(56) References Cited

U.S. PATENT DOCUMENTS

| | | |
|---|---|---|
| 2008/0241508 A1 | 10/2008 | Kuwabara et al. |
| 2010/0003459 A1 | 1/2010 | Ohishi et al. |
| 2010/0245715 A1* | 9/2010 | Watanabe ............... G02B 5/02 |
| | | 349/64 |
| 2010/0245722 A1 | 9/2010 | Yoneyama et al. |
| 2010/0246011 A1 | 9/2010 | Ohishi et al. |
| 2012/0002397 A1 | 1/2012 | Iwata et al. |
| 2013/0250414 A1* | 9/2013 | Eguchi ............... G02B 5/0242 |
| | | 359/488.01 |
| 2018/0341049 A1 | 11/2018 | Serizawa et al. |

FOREIGN PATENT DOCUMENTS

| | | |
|---|---|---|
| JP | 2007-045142 A | 2/2007 |
| JP | 2008-292987 A | 12/2008 |
| JP | 2011-232683 A | 11/2011 |
| JP | 5066535 B2 | 11/2012 |
| JP | WO 2017/138644 | 2/2018 |
| TW | 201202763 A1 | 1/2012 |
| WO | WO 2007/111026 A | 10/2007 |
| WO | WO 2008/093769 A | 8/2008 |

* cited by examiner

FIG. 4A                    EXAMPLE 5
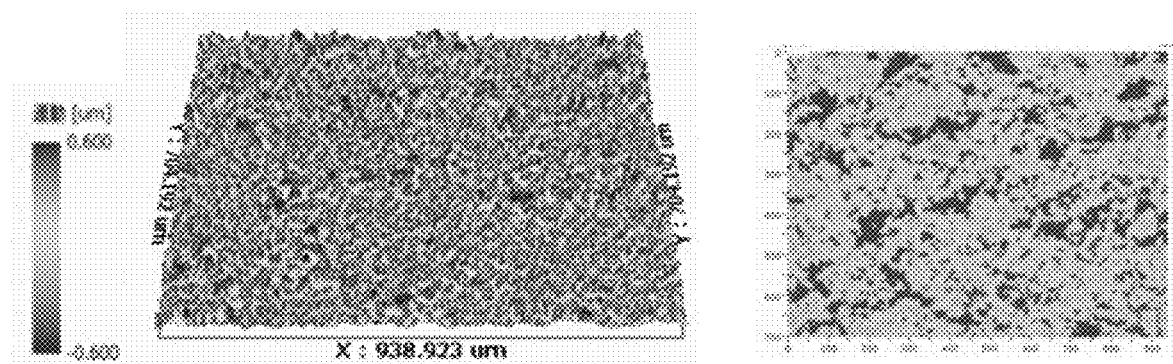
FIG. 4B          COMPERATIVE EXAMPLE 5
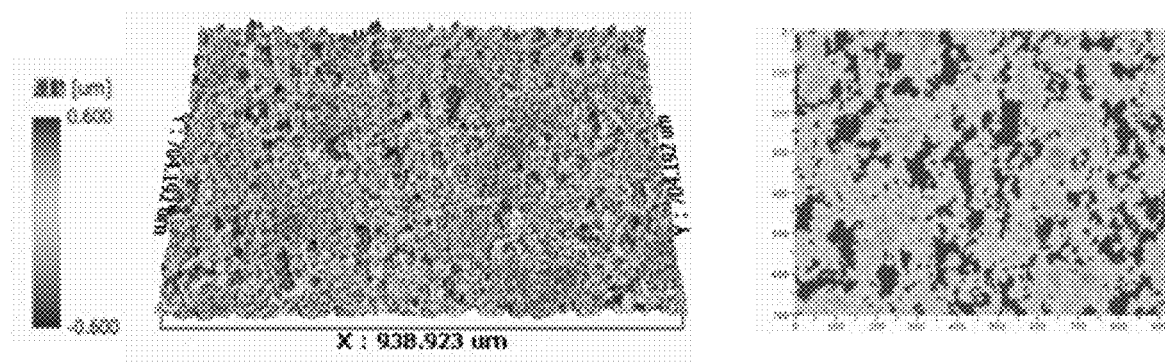

OPTICAL LAMINATE, POLARIZER, AND DISPLAY APPARATUS

CROSS REFERENCE TO RELATED APPLICATIONS

This application is a continuation application of International Application No. PCT/JP2017/005308, filed on Feb. 14, 2017, which claims priority to Japanese Patent Application No. 2016-027340, filed on Feb. 16, 2016. The disclosures of these applications are hereby incorporated by reference.

BACKGROUND

Field

The present disclosure relates to optical laminates suitable for anti-glare films, and polarizers and display apparatuses equipped with the optical laminates.

Description of the Related Art

An anti-glare film has, on its surface, a concave-convex structure which scatters external light, and thereby has anti-glare properties. The concave-convex structure on the surface of the anti-glare film is formed by the aggregation of particles (filler) in a resin layer.

The anti-glare film is required to have functions such as anti-dazzle properties and high contrast in addition to anti-glare properties. The anti-glare properties, anti-dazzle properties, and contrast of the anti-glare film have conventionally been improved by adjusting the shape, particle size, and refractive index of particles (filler), the physical properties (viscosity) and coating process of a coating material, etc., thereby optimizing the concave-convex structure (external scattering) on the surface and internal scattering. Note that there are trade-offs between the anti-glare properties, anti-dazzle properties, and contrast of the anti-glare film.

The anti-glare properties increase with an increase in the particle size of the filler, the added amount of the filler, and the aggregation of the filler. In this case, as the concave-convex size increases, the anti-glare properties increase, but the anti-dazzle properties deteriorate due to an increase in the lens effect.

The anti-dazzle properties are improved with an increase in internal scattering due to the use of a filler having a refractive index that is greatly different from that of the resin or an increase in the added amount of the filler. In this case, however, diffused light increases, and therefore, the contrast decreases.

The contrast is improved with a decrease in internal scattering, but the anti-dazzle properties deteriorate. Alternatively, the contrast is also improved by providing a low-reflection layer. However, the resultant multilayer arrangement is disadvantageous in terms of cost.

SUMMARY

Since the resolution of image display panels has been increasing in recent years, the anti-dazzle properties of existing anti-glare films are not sufficient, and therefore, there is a demand for an anti-glare film having improved anti-dazzle properties while maintaining the anti-glare properties and contrast thereof.

Therefore, it is an object of the present disclosure to provide an optical laminate that can suppress dazzle while maintaining the anti-glare properties and contrast thereof when applied to image display panels, particularly an image display panel having a high resolution of not lower than 200 ppi, and a polarizer and image display apparatus including the optical laminate.

The present disclosure relates to an optical laminate including a translucent substrate, and at least one optical functional layer provided on the translucent substrate. In the optical laminate according to the present disclosure, a concave-convex shape is formed on at least one surface of the optical functional layer. The optical functional layer contains two types of inorganic fine particles, and resin particles. The optical laminate has an internal haze X and a total haze Y satisfying the following conditions (1) to (4)

$Y > X$ (1)

$Y \leq X + 25$ (2)

$Y \leq 50$ (3)

$7 \leq X \leq 25$ (4)

The optical laminate has a transmitted image clarity of 15% to 55% as measured using a 0.5-mm width optical comb. The number of projections having a height of not smaller than 0.1 μm is not less than 900 per mm² of measurement area in the concave-convex shape as measured by optical interferometry at an outermost surface of the optical functional layer.

A polarizer and an image display apparatus according to the present disclosure includes with the above optical laminate.

According to the present disclosure, an optical laminate that can suppress dazzle while maintaining the anti-glare properties and contrast thereof even when applied to an image display panel having a high resolution of not lower than 200 ppi, and a polarizer and an image display apparatus including the optical laminate, can be provided.

These and additional objects, features, aspects, and advantages of the present disclosure will be more fully apparent from the following detailed description and accompanying drawings.

BRIEF DESCRIPTION OF THE DRAWINGS

FIG. 4A is a diagram showing a concave-convex shape on a surface of the optical laminate of Example 5;

FIG. 4B is a diagram showing a concave-convex shape on a surface of an optical functional layer of the optical laminate of Comparative example 5.

DETAILED DESCRIPTION

Figure 1:
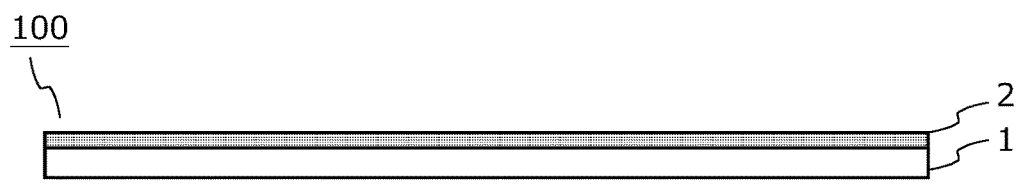
FIG. 1 is a cross-sectional view schematically showing a structure of an optical laminate according to an embodiment.

FIG. 1 is a cross-sectional view schematically showing a structure of an optical laminate according to an embodiment. An optical laminate 100 according to the embodiment includes a translucent substrate 1, and at least one optical functional layer 2 provided on the translucent substrate 1. A surface of the optical functional layer 2 has micro-concave-convex shape. This concave-convex shape reflects external light diffusely, thereby allowing the optical functional layer 2 to have anti-glare properties.

As the translucent substrate, various resin films can be preferably used, such as polyethylene terephthalate (PET), triacetylcellulose (TAC), polyethylene naphthalate (PEN), polymethyl methacrylate (PMMA), polycarbonates (PC), polyimides (PI), polyethylene (PE), polypropylene (PP), polyvinyl alcohol (PVA), polyvinyl chloride (PVC), cycloolefin copolymers (COC), norbornene-containing resins, polyether sulfones, cellophane, and aromatic polyamides.

The translucent substrate preferably has a total light transmittance (JIS K7105) of not smaller than 80%, more preferably not smaller than 90%. The translucent substrate preferably has a thickness of 1 μm to 700 μm, more preferably 25 μm to 250 μm, in terms of the productivity and ease of handling of the optical laminate.

The translucent substrate is preferably subjected to a surface modification treatment in order to improve tight adhesion to the optical functional layer. As the surface modification treatment, alkali treatment, corona treatment, plasma treatment, sputtering treatment, coating with a surfactant, a silane coupling agent, etc., Si deposition, and the like can be exemplified.

The optical functional layer contains a base resin, resin particles (organic filler), and two types of inorganic fine particles. The optical functional layer is formed by applying a resin composition that is a mixture of a base resin curable by irradiation with ionizing radiation or ultraviolet light, resin particles, and two types of inorganic fine particles, to the translucent substrate, and curing the resultant coating film.

Hereinafter, the components of the resin composition for use in forming the optical functional layer will be described.

As the base resin, a resin curable by irradiation with ionizing radiation or ultraviolet light can be used.

As the resin material curable by irradiation with ionizing radiation, monomers, oligomers, and prepolymers that have a radical polymerizable functional group, such as an acryloyl group, a methacryloyl group, an acryloyloxy group, or a methacryloyloxy group, or a cation polymerizable functional group, such as an epoxy group, a vinyl ether group, or an oxetane group, can be used alone or in combination. As the monomer, methyl acrylate, methyl methacrylate, methoxy polyethylene methacrylate, cyclohexyl methacrylate, phenoxyethyl methacrylate, ethylene glycol dimethacrylate, dipentaerythritol hexaacrylate, trimethylol propane trimethacrylate, pentaerythritol triacrylate, and the like can be exemplified. As the oligomer and the prepolymer, acrylate compounds such as polyester acrylates, polyurethane acrylates, polyfunctional urethane acrylates, epoxy acrylates, polyether acrylates, alkyd acrylates, melamine acrylate, and silicone acrylates, unsaturated polyesters, tetramethylene glycol diglycidyl ether, propylene glycol diglycidyl ether, neopentylglycol diglycidyl ether, bisphenol A diglycidyl ether, epoxy compounds such as various alicyclic epoxy resins, and oxetane compounds such as 3-ethyl-3-hydroxymethyl oxetane, 1,4-bis{[(3-ethyl-3-oxetanyl) methoxy]methyl}benzene, and di[1-ethyl(3-oxetanyl)] methyl ether can be exemplified.

The above resin materials can be cured by irradiation with ultraviolet light, provided that a photopolymerization initiator is added. As the photopolymerization initiator, radical polymerization initiators, such as acetophenone-based, benzophenone-based, thioxanthone-based, benzoin, and benzoin methyl ether, and cationic polymerization initiators, such as aromatic diazonium salts, aromatic sulfonium salts, aromatic iodonium salts, and metallocene compounds, can be used alone or in combination.

The resin particles (organic filler) added to the optical functional layer aggregate in the base resin to form a micro-concave-convex structure at a surface of the optical functional layer. As the resin particles, particles of a translucent resin material, such as an acrylic resin, a polystyrene resin, a styrene-(meth)acrylic acid ester copolymer, a polyethylene resin, an epoxy resin, a silicone resin, polyvinylidene fluoride, or a florinated polyethylene resin, can be used. The material for the resin particles preferably has a refractive index of 1.40 to 1.75. In order to adjust the refractive index or the dispersion of the resin particles, a mixture of two or more types of resin particles having different properties (refractive index) may be used.

In addition, the refractive index $n_f$ of the resin particles and the refractive index $n_z$ of the base resin preferably satisfy a condition (α) below, more preferably a condition (β) below.

$$|n_z - n_f| \geq 0.025 \quad (\alpha)$$

$$|n_z - n_f| \geq 0.035 \quad (\beta)$$

If the refractive index $n_z$ of the base resin and the refractive index $n_f$ of the resin particles do not satisfy the condition (α), the added amount of the resin particles needs to be increased in order to obtain a desired internal haze, resulting in a deterioration in image clarity.

The resin particles preferably have an average particle size of 0.3 μm to 10.0 μm, more preferably 1.0 μm to 7.0 μm. If the average particle size of the resin particles is smaller than 0.3 μm, the anti-glare properties decrease. Meanwhile, if the average particle size of the resin particles is greater than 10.0 μm, ratio between concave area and convex area on the surface of the optical function layer cannot be controlled, resulting in a deterioration in the anti-dazzle properties.

In the optical laminate of this embodiment, the content of the resin particles in the optical functional layer is 5.0% to 13.0% of the solid content of the optical functional layer. If the content of the resin particles is smaller than 5.0%, the concave portions and convex portions decreases on the surface of the optical functional layer decreases, resulting in a decrease in the anti-glare properties. Meanwhile, if the content of the resin particles is greater than 13.0%, the anti-dazzle properties decrease.

As the two types of inorganic fine particles, first inorganic fine particles and second inorganic fine particles are added to the base resin of the optical functional layer.

As the first inorganic fine particles, colloidal silica, alumina, and zinc oxide can be used alone or in combination. The addition of the first inorganic fine particles can suppress excessive aggregation of the resin particles, and thereby allow a concave-convex structure formed on the surface of the optical functional layer to be uniform, i.e., suppress a local increase in the roughness. The addition of the first inorganic fine particles can also improve the anti-dazzle properties while the anti-glare properties and the high contrast are maintained.

The first inorganic fine particles are preferably inorganic nanoparticles having an average particle size of 10 nm to 100 nm. When colloidal silica is used as the first inorganic fine particles, the average particle size of the first inorganic fine particles is more preferably approximately 20 nm. When alumina or zinc oxide is used as the first inorganic fine particles, the average particle size of the first inorganic fine particles is more preferably approximately 40 nm. The added amount of the first inorganic fine particles is preferably 0.05% to 10%, more preferably 0.1% to 3.0%, with respect to the entire weight of the resin composition for forming the optical functional layer. If the added amount of the first inorganic fine particles does not fall within that range, ratio between concave area and convex area on the surface of the optical function layer cannot be controlled, resulting in a deterioration in the anti-dazzle properties.

The second inorganic fine particles are preferably inorganic nanoparticles having an average particle size of 10 nm to 200 nm. The added amount of the second inorganic fine particles is preferably 0.1% to 5.0%. As the second inorganic fine particles, for example, swellable clay can be used. The swellable clay may be one that can perform cation exchange, and take a solvent into its interlayer spaces to swell. The swellable clay may be either a naturally-occurring one or a synthetic one (including a substituted form and a derivative form). Alternatively, the swellable clay may be a mixture of a naturally-occurring one and a synthetic one. As the swellable clay, micas, synthetic micas, vermiculite, montmorillonite, iron montmorillonite, beidellite, saponite, hectorite, stevensite, nontronite, magadiite, ilerite, kanemite, layered titanates, smectites, synthetic smectites, and the like can be exemplified. These swellable clays may be used alone or in combination.

As the second inorganic fine particles, layered organic clays are more preferable. In the present disclosure, the layered organic clay refers to swellable clay having organic onium ions introduced into its interlayer spaces. The organic onium ion may be any one that can convert swellable clay into an organic form by means of the cation exchange capability of the swellable clay. As the second inorganic fine particles, for example, synthetic smectites (layered organic clay minerals) can be used. The synthetic smectite functions as a thickener that increases the viscosity of the resin composition for forming the optical functional layer. The addition of the synthetic smectite as a thickener suppresses the precipitation of the resin particles and the first inorganic fine particles, and thereby contributes to the formation of the concave-convex structure on the surface of the optical functional layer.

When the first and second inorganic fine particles are used in combination, the first and second inorganic fine particles form an aggregate in the optical functional layer. This aggregate suppresses the aggregation of the resin particles, and thereby levels the height of the concave-convex shape on the surface of the optical functional layer, and therefore, light is uniformly scattered by the surface of the optical functional layer, resulting in an improvement in the anti-dazzle properties.

The resin composition for forming the optical functional layer may additionally contain a leveling agent. The leveling agent has the function of being aligned along the surface of the coating film in the drying process, to impart uniform surface tension to the coating film, and thereby reducing surface defects in the coating film.

The resin composition for forming the optical functional layer may further additionally contain an organic solvent as appropriate. Examples of the organic solvent include alcohols, esters, ketones, ethers, and aromatic hydrocarbons.

The optical functional layer preferably has a thickness of 1.0 µm to 12.0 µm, more preferably 3.0 µm to 10.0 µm. If the thickness of the optical functional layer is smaller than 1 µm, oxygen inhibits curing, resulting in faulty curing, so that the scratch resistance of the optical functional layer is likely to decrease. Meanwhile, if the thickness of the optical functional layer is greater than 12.0 µm, the optical functional layer unfavorably curls strongly due to the shrinkage of the cured base resin layer.

The thickness of the optical functional layer is also preferably 100% to 140% of the average particle size of the resin particles, more preferably 100% to 130% of the average particle size of the resin particles. If the thickness of the optical functional layer is smaller than 100% of the average particle size of the resin particles, the optical functional layer has a noticeable white or whitish color, resulting in low-quality anti-glare properties. Meanwhile, if the thickness of the optical functional layer is greater than 140% of the average particle size of the resin particles, it is difficult to suppress aggregation of the resin particles, resulting in insufficient anti-dazzle properties.

The optical laminate of this embodiment has an internal haze X and a total haze Y that simultaneously satisfy conditions (1) to (4) below.

$$Y > X \tag{1}$$

$$Y \leq X + 25 \tag{2}$$

$$Y \leq 50 \tag{3}$$

$$7 \leq X \leq 25 \tag{4}$$

If the internal haze X does not satisfy the condition (4), and is smaller than 7%, the anti-dazzle properties are insufficient. Meanwhile, if the internal haze X does not satisfy the condition (4), and is greater than 25%, the contrast decreases.

If the total haze Y does not satisfy the condition (3), and is greater than 50%, the concave-convex shape on the surface of the optical functional layer becomes rough, resulting in insufficient anti-dazzle properties.

The optical laminate of this embodiment has a transmitted image clarity of 15% to 55% as measured using a 0.5 mm-width optical comb. If the transmitted image clarity is smaller than 15%, the anti-dazzle properties deteriorate. Meanwhile, if the transmitted image clarity is greater than 55%, the anti-glare properties deteriorate.

The concave-convex shape on the surface of the optical functional layer of the present embodiment has not smaller than 900 projections having a height of not smaller than 0.1 µm per $mm^2$ of measurement area as measured by optical interferometry. Here, the height of the projection refers to a difference in level between a projection and an average level (height 0) of all concave-convex shape in a direction perpendicular to a measurement surface, where the average level is set as a reference. If the number of projections having a height of not smaller than 0.1 µm is less than 900 per $mm^2$ of measurement area, the area occupied by each projection increases due to the aggregation of the resin particles, and therefore, when the optical laminate is used as an anti-glare film for an image display apparatus of not smaller than 200 ppi, the anti-dazzle properties deteriorate.

In the concave-convex shape on the surface of the optical functional layer of the present embodiment, the number of projections having a height of not smaller than 0.7 µm is not greater than 60 per $mm^2$ of measurement area, as measured by optical interferometry. If the number of projections having a height of not smaller than 0.7 µm is not greater than 60 per $mm^2$ of measurement area, the number of local portions having a great roughness decrease, resulting in an improvement in the anti-dazzle properties.

In the concave-convex shape on the surface of the optical functional layer of the present embodiment, the average area of all projections having a height of not smaller than 0.1 μm is not greater than 310 μm$^2$, as measured by optical interferometry. If the number of projections having a height of not smaller than 0.1 μm is not less than 900 per mm$^2$, and the average area of those projections is not greater than 310 μm$^2$, the area of each projection decreases, and the projections are uniformly distributed, resulting in an improvement in the anti-dazzle properties.

In order to suppress excessive filler aggregation, adjusting the viscosity of the coating material, increasing the solid concentration of the coating material during a coating process, or using a solvent having a high volatilization rate to suppress the convection of the solvent during a drying process, has conventionally been employed. However, these techniques have the problem that a surface defect such as uneven coating is more likely to occur. In contrast to this, as described in the above embodiment, the method of adding two types of inorganic fine particles does not have influence on the physical properties or drying speed of the coating material, and therefore, can improve the anti-dazzle properties while maintaining suitability to coating.

Figure 2:
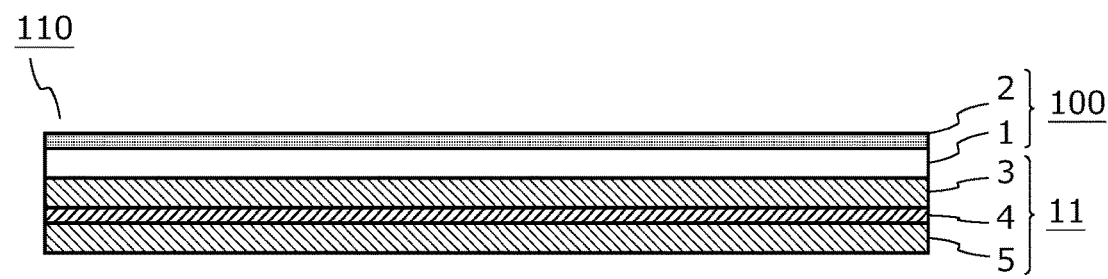
FIG. 2 is a cross-sectional view schematically showing a structure of a polarizer according to the embodiment.

FIG. 2 is a cross-sectional view schematically showing a structure of a polarizer according to the embodiment. A polarizer 110 includes an optical laminate 100 and a polarizing film 11. The optical laminate 100 is the same as that shown in FIG. 1. The polarizing film (polarizing substrate) 11 is provided on a surface of the translucent substrate 1 on which the optical functional layer 2 is not provided. For example, the polarizing film 11 includes a transparent substrate 3, a polarizing layer 4, and a transparent substrate 5, which are layered in this order. The materials for the transparent substrates 3 and 5 and the polarizing layer 4 are not particularly limited, and may be those that are typically used in polarizing films, as appropriate.

Figure 3:
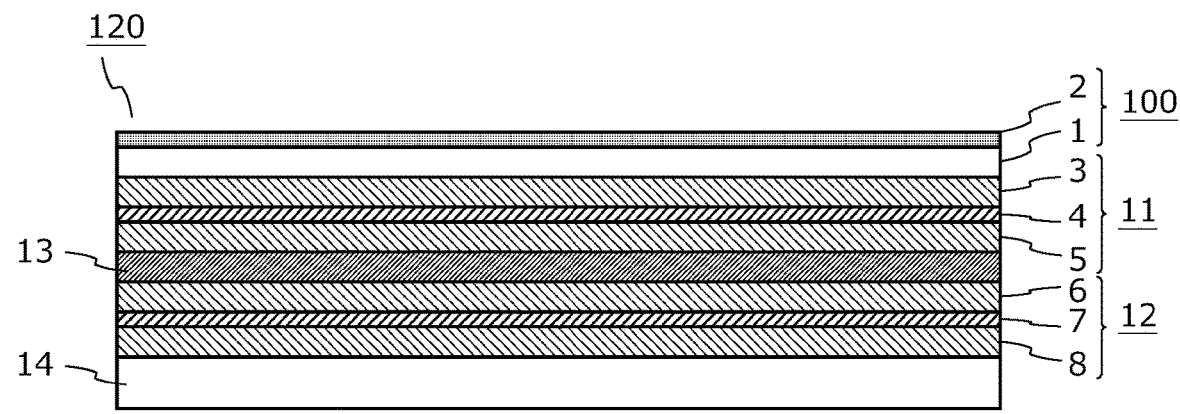
FIG. 3 is a cross-sectional view schematically showing a structure of a display apparatus according to the embodiment.

FIG. 3 is a cross-sectional view schematically showing a structure of a display apparatus according to the embodiment. A display apparatus 120 includes an optical laminate 100, a polarizing film 11, a liquid crystal cell 13, a polarizing film (polarizing substrate) 12, and a backlight unit 14, which are put on top of each other in that order. For example, the polarizing film 12 includes a transparent substrate 6, a polarizing layer 7, and a transparent substrate 8, which are layered in this order. The materials for the transparent substrates 6 and 8 and the polarizing layer 7 are not particularly limited, and may be those that are typically used in polarizing films, as appropriate. The liquid crystal cell 13 is an apparatus that includes: a liquid crystal panel in which liquid crystal molecules are enclosed between a pair of transparent substrates having transparent electrodes; and a color filter. The liquid crystal cell 13 forms an image by controlling the light transmittance of each pixel by changing the orientations of the liquid crystal molecules according to a voltage applied between the transparent electrodes. The backlight unit 14 is an illumination apparatus that includes a light source (not shown) and a light diffuser (not shown). The backlight unit 14 uniformly diffuses light emitted from the light source, and thereby emits the resultant light from a light emission surface thereof.

Note that the display apparatus 120 of FIG. 3 may further include a diffusion film, a prism sheet, a luminance improvement film, a retardation film for compensating a phase difference in the liquid crystal cell or the polarizer, and a touch sensor.

The optical laminate of this embodiment may further have at least one of a refractive index adjustment layer such as a low-refractive index layer, an anti-static layer, and an antifouling layer, in addition to the optical functional layer for suppressing dazzle.

The low-refractive index layer is a functional layer that is provided on the optical functional layer for suppressing dazzle, and is for reducing the refractive index of the surface to reduce the reflectance. The low-refractive index layer may be formed by applying a coating liquid containing an ionizing radiation curable material, such as a polyester acrylate monomer, an epoxy acrylate monomer, a urethane acrylate monomer, or a polyol acrylate monomer, and an polymerization initiator, and causing the coating film to undergo polymerization so that the coating film is cured. In the low-refractive index layer, low-refractive index fine particles formed of a low-refractive index material, such as LiF, MgF, 3NaF.AlF or AlF (all have a refractive index of 1.4), or $Na_3AlF_6$ (cryolite, refractive index: 1.33), may be dispersed. Alternatively, as the low-refractive index fine particles, particles having a void therein may preferably be used. The particles having a void therein, in which the void can have the same refractive index (≈1) as that of air, can be a low-refractive index particle having a considerably low refractive index. Specifically, the refractive index can be reduced by using low-refractive index silica particles having a void therein.

The anti-static layer can be formed by applying a coating liquid containing an ionizing radiation curable material, such as a polyester acrylate monomer, an epoxy acrylate monomer, a urethane acrylate monomer, or a polyol acrylate monomer, a polymerization initiator, and an anti-static agent, and causing the coating film to undergo polymerization so that the coating film is cured. As the antistatic agent, for example, fine particles of a metal oxide, such as antimony-doped tin oxide (ATO) or tin-doped indium oxide (ITO), a macromolecular conductive composition, a quaternary ammonium salt, etc., may be used. The anti-static layer may be provided on the outermost surface of the optical laminate, or between the optical functional layer for suppressing dazzle and the translucent substrate.

The antifouling layer is provided on the outermost surface of the optical laminate to impart water repellency and/or oil repellency to the optical laminate, and thereby enhancing the antifouling properties of the optical laminate. The antifouling layer may be formed of silicon oxide, a fluorine-containing silane compound, a fluoroalkyl silazane, a fluoroalkyl silane, a fluorine-containing silicon-based compound, or a perfluoropolyether group-containing silane coupling agent, by dry coating or wet coating.

Instead of or in addition to the above low-refractive index layer, anti-static layer, and antifouling layer, at least one of an infrared absorption layer, an ultraviolet absorption layer, a color correction layer, etc., may be provided.

Examples

Examples in which an optical laminate according to the embodiment is specifically implemented or carried out will now be described.

(Production Method for Optical Laminate)

A coating liquid for forming an optical functional layer that contains materials described below at proportions shown in Tables 1 and 2 was formulated. The formulated coating liquid was applied to a triacetylcellulose film (translucent substrate) having a thickness of 40 μm. The resultant coating film was dried (the solvent was vaporized). Thereafter, the resultant coating film was caused to undergo polymerization so that the coating film is cured to form an optical functional layer. Thus, optical laminates according to Examples 1 to 13 and Comparative examples 1 to 8 were obtained. Note that, in Table 1, "-" indicates that the corresponding material is not blended.

[Materials Used in Coating Liquid for Forming Optical Functional layer]

Base resin: UV/EB curable resin Light Acrylate PE-3A (pentaerythritol triacrylate, manufactured by Kyoeisha Chemical, Co., Ltd.), refractive index: 1.52

Resin particles (organic filler):
  crosslinked styrene narrow-dispersion particles SX350H (manufactured by Soken Chemical & Engineering Co., Ltd.), average particle size: 3.50 μm, refractive index: 1.595
  Techpolymer SSX2035JXE (manufactured by Sekisui Plastics Co., Ltd.), average particle size: 3.35 μm, refractive index: 1.565
  Techpolymer SSX504TNR (manufactured by Sekisui Plastics Co., Ltd.), average particle size: 3.60 μm, refractive index: 1.555
  Techpolymer XX-104CR (manufactured by Sekisui Plastics Co., Ltd.), average particle size: 3.50 μm, refractive index: 1.595
  Techpolymer XX-62CR (manufactured by Sekisui Plastics Co., Ltd.), average particle size: 3.50 μm, refractive index: 1.515

Note that the materials SX350H and XX-104CR are polystyrenes, and the materials SSX2035JXE, SSX504TNR, and XX-62CR are styrene-methyl methacrylate copolymers.

Colloidal silica: organosilica sol MEK-ST-40 (manufactured by Nissan Chemical Industries, Ltd.), average grain size: 10 nm to 15 nm Synthetic smectite: lucentite SAN (manufactured by Co-op Chemical Co., Ltd.)

Fluorine-based leveling agent: MEGAFACE F-471 (manufactured by DIC Corporation), 0.1%

Solvent: toluene

Tables 1 and 2 show the compositions of the resin particles used in Examples 1 to 13 and Comparative examples 1 to 8. Tables 3 and 4 show the composition, thickness, haze value, transmitted image clarity, measured value of the number of projections having a height of not smaller than 0.1 μm present in the outermost surface of the optical functional layer, and evaluation results of anti-glare properties, anti-dazzle properties, luminance ratio, and thickness conditions, of the coating liquids for forming an optical functional layer of Examples 1 to 13 and Comparative examples 1 to 8. In Tables 1 and 2, Pst represents a polystyrene, and Pst/PMMA represents a styrene-methyl methacrylate copolymer.

TABLE 1

| | Resin particles 1 | | | | | Resin particles 2 | | | | |
|---|---|---|---|---|---|---|---|---|---|---|
| | Material | Material | Refractive index | Average particle size | Added amount | Material | Material | Refractive index | Average particle size | Added amount |
| Example 1 | SX350H | PSt | 1.595 | 3.50 | 5.0% | — | — | — | — | — |
| Example 2 | SX350H | PSt | 1.595 | 3.50 | 5.0% | — | — | — | — | — |
| Example 3 | SSX2035JXE | PSt/PMMA | 1.565 | 3.35 | 2.0% | SX350H | PSt | 1.595 | 3.50 | 5.0% |
| Example 4 | SSX2035JXE | PSt/PMMA | 1.565 | 3.35 | 4.4% | SSX504TNR | PSt/PMMA | 1.555 | 3.60 | 4.4% |
| Example 5 | SSX2035JXE | PSt/PMMA | 1.565 | 3.35 | 1.1% | XX-104CR | PSt | 1.595 | 3.50 | 7.7% |
| Example 6 | SSX2035JXE | PSt/PMMA | 1.565 | 3.35 | 5.8% | XX-104CR | PSt | 1.595 | 3.50 | 3.0% |
| Example 7 | SSX2035JXE | PSt/PMMA | 1.565 | 3.35 | 3.4% | XX-104CR | PSt | 1.595 | 3.50 | 5.4% |
| Example 8 | SSX2035JXE | PSt/PMMA | 1.565 | 3.35 | 3.4% | SX350H | PSt | 1.595 | 3.50 | 5.4% |
| Example 9 | SSX2035JXE | PSt/PMMA | 1.565 | 3.35 | 3.4% | SX350H | PSt | 1.595 | 3.50 | 5.4% |
| Example 10 | SSX2035JXE | PSt/PMMA | 1.565 | 3.35 | 6.4% | SX350H | PSt | 1.595 | 3.50 | 4.6% |
| Example 11 | SSX2035JXE | PSt/PMMA | 1.565 | 3.35 | 6.4% | SX350H | PSt | 1.595 | 3.50 | 4.6% |
| Example 12 | SSX2035JXE | PSt/PMMA | 1.565 | 3.35 | 7.3% | SX350H | PSt | 1.595 | 3.50 | 5.7% |
| Example 13 | SSX2035JXE | PSt/PMMA | 1.565 | 3.35 | 7.3% | SX350H | PSt | 1.595 | 3.50 | 5.7% |

TABLE 2

| | Resin particles 1 | | | | | Resin particles 2 | | | | |
|---|---|---|---|---|---|---|---|---|---|---|
| | Material | Material | Refractive index | Average particle size | Added amount | Material | Material | Refractive index | Average particle size | Added amount |
| Comparative example 1 | SX350H | PSt | 1.595 | 3.50 | 4.0% | — | — | — | — | — |
| Comparative example 2 | SSX2035JXE | PSt/PMMA | 1.565 | 3.35 | 2.0% | SX350H | PSt | 1.595 | 3.50 | 5.0% |
| Comparative example 3 | SSX2035JXE | PSt/PMMA | 1.565 | 3.35 | 4.4% | SSX504TNR | PSt/PMMA | 1.555 | 3.60 | 4.4% |
| Comparative example 4 | SSX2035JXE | PSt/PMMA | 1.565 | 3.35 | 4.4% | SSX504TNR | PSt/PMMA | 1.555 | 3.60 | 4.4% |
| Comparative example 5 | SSX2035JXE | PSt/PMMA | 1.565 | 3.35 | 5.8% | XX-104CR | PSt | 1.595 | 3.50 | 3.0% |
| Comparative example 6 | SSX2035JXE | PSt/PMMA | 1.565 | 3.35 | 4.4% | XX-62CR | PSt/PMMA | 1.515 | 3.50 | 4.4% |
| Comparative example 7 | SSX2035JXE | PSt/PMMA | 1.565 | 3.35 | 8.8% | SX350H | PSt | 1.595 | 3.50 | 7.2% |
| Comparative example 8 | SSX2035JXE | PSt/PMMA | 1.565 | 3.35 | 8.8% | SX350H | PSt | 1.595 | 3.50 | 7.2% |

TABLE 3

|  | Resin particles (total) | | First inorganic fine particles | | Second inorganic fine particles | |
|---|---|---|---|---|---|---|
|  | Average particle size | Added amount | Material | Added amount | Material | Added amount |
| Example 1 | 3.50 | 5.0% | Colloidal silica | 0.5% | Synthetic smectite | 1.8% |
| Example 2 | 3.50 | 5.0% | Colloidal silica | 0.1% | Synthetic smectite | 1.8% |
| Example 3 | 3.46 | 7.0% | Colloidal silica | 0.5% | Synthetic smectite | 1.8% |
| Example 4 | 3.48 | 8.8% | Colloidal silica | 0.5% | Synthetic smectite | 1.8% |
| Example 5 | 3.48 | 8.8% | Colloidal silica | 0.5% | Synthetic smectite | 0.5% |
| Example 6 | 3.40 | 8.8% | Colloidal silica | 0.5% | Synthetic smectite | 1.8% |
| Example 7 | 3.44 | 8.8% | Colloidal silica | 0.5% | Synthetic smectite | 1.8% |
| Example 8 | 3.44 | 8.8% | Colloidal silica | 1.0% | Synthetic smectite | 1.8% |
| Example 9 | 3.44 | 8.8% | Colloidal silica | 1.5% | Synthetic smectite | 1.8% |
| Example 10 | 3.41 | 11.0% | Colloidal silica | 0.5% | Synthetic smectite | 1.8% |
| Example 11 | 3.41 | 11.0% | Colloidal silica | 1.5% | Synthetic smectite | 1.8% |
| Example 12 | 3.42 | 13.0% | Colloidal silica | 1.0% | Synthetic smectite | 1.8% |
| Example 13 | 3.42 | 13.0% | Colloidal silica | 3.0% | Synthetic smectite | 1.8% |
| Comparative example 1 | 3.50 | 4.0% | Colloidal silica | 0.5% | Synthetic smectite | 1.8% |
| Comparative example 2 | 3.46 | 7.0% | Colloidal silica | 2.0% | Synthetic smectite | 1.8% |
| Comparative example 3 | 3.48 | 8.8% | — | — | Synthetic smectite | 1.8% |
| Comparative example 4 | 3.48 | 8.8% | Colloidal silica | 0.5% | Synthetic smectite | 1.8% |
| Comparative example 5 | 3.40 | 8.8% | Colloidal silica | 0.5% | Synthetic smectite | 1.8% |
| Comparative example 6 | 3.43 | 8.8% | Colloidal silica | 0.5% | Synthetic smectite | 1.8% |
| Comparative example 7 | 3.42 | 16.0% | Colloidal silica | 1.5% | Synthetic smectite | 1.8% |
| Comparative example 8 | 3.42 | 16.0% | Colloidal silica | 3.0% | Synthetic smectite | 1.8% |

TABLE 4

|  | Thickness ($\mu$m) | Haze | | Transmitted image clarity (%) | Number of projectionss of not smaller than 0.1 $\mu$m (/mm$^2$) | Antidazzle properties | Antiglare properties | Luminance ratio | Thickness conditions |
|---|---|---|---|---|---|---|---|---|---|
|  |  | Total haze Y (%) | Internal haze X (%) |  |  |  |  |  |  |
| Example 1 | 4.0 | 26.5 | 14.5 | 50 | 940 | ○ | ○ | ○ | ○ |
| Example 2 | 4.2 | 29.3 | 16.1 | 53 | 1241 | ○ | ○ | ○ | ○ |
| Example 3 | 4.3 | 35.9 | 19.7 | 38 | 1261 | ○ | ○ | ○ | ○ |
| Example 4 | 3.6 | 29.8 | 7.4 | 35 | 1414 | ○ | ○ | ○ | ○ |
| Example 5 | 4.6 | 38.2 | 22.6 | 41 | 1030 | ○ | ○ | ○ | ○ |
| Example 6 | 4.3 | 31.3 | 13.9 | 32 | 950 | ○ | ○ | ○ | ○ |
| Example 7 | 4.2 | 31.5 | 17.3 | 47 | 977 | ○ | ○ | ○ | ○ |
| Example 8 | 4.8 | 37.6 | 21.4 | 33 | 1314 | ○ | ○ | ○ | ○ |
| Example 9 | 4.8 | 36.0 | 21.6 | 38 | 1258 | ○ | ○ | ○ | ○ |
| Example 10 | 4.5 | 44.3 | 19.5 | 19 | 1086 | ○ | ○ | ○ | ○ |
| Example 11 | 4.5 | 44.3 | 20.3 | 43 | 1151 | ○ | ○ | ○ | ○ |
| Example 12 | 4.4 | 46.0 | 23.2 | 19 | 961 | ○ | ○ | ○ | ○ |
| Example 13 | 4.5 | 47.1 | 24.0 | 26 | 1040 | ○ | ○ | ○ | ○ |
| Comparative example 1 | 4.5 | 23.2 | 13.0 | 61 | 921 | ○ | x | ○ | ○ |
| Comparative example 2 | 4.3 | 30.4 | 20.3 | 72 | 963 | ○ | x | ○ | ○ |

TABLE 4-continued

|  | Thickness (μm) | Haze | | Transmitted image clarity (%) | Number of projectionss of not smaller than 0.1 μm (/mm²) | Antidazzle properties | Antiglare properties | Luminance ratio | Thickness conditions |
|---|---|---|---|---|---|---|---|---|---|
|  |  | Total haze Y (%) | Internal haze X (%) |  |  |  |  |  |  |
| Comparative example 3 | 4.5 | 22.4 | 8.2 | 21 | 792 | x | ∘ | ∘ | ∘ |
| Comparative example 4 | 5.7 | 30.2 | 12.1 | 32 | 858 | x | ∘ | ∘ | x |
| Comparative example 5 | 5.0 | 31.9 | 15.8 | 26 | 511 | x | ∘ | ∘ | x |
| Comparative example 6 | 4.0 | 25.6 | 5.3 | 41 | 1284 | x | ∘ | ∘ | ∘ |
| Comparative example 7 | 4.3 | 55.5 | 28.1 | 5 | 1075 | x | ∘ | x | ∘ |
| Comparative example 8 | 4.3 | 53.4 | 29.5 | 11 | 890 | x | ∘ | x | ∘ |

Note that, in Tables 1 to 4, the proportion of each component added means how much of that component is present (mass %) as compared to the total content of all solids in the coating liquid for forming the optical functional layer. As used herein, all solids of the coating liquid for forming the optical functional layer refer to all components excluding the solvent of the coating liquid for forming the optical functional layer. Therefore, the blended proportions (mass %) of the resin particles, the first inorganic fine particles, and the second inorganic fine particles in all solids of the coating liquid for forming the optical functional layer are equal to the blended proportions (mass %) of the resin particles, the first inorganic fine particles, and the second inorganic fine particles in the optical functional layer obtained by curing the coating liquid for forming the optical functional layer.

The thickness, the haze value, the transmitted image clarity, and the number of projections having a height of not smaller than 0.1 μm present in the outermost surface of the optical functional layer, were measured as follows.

[Thickness]

The thickness of the optical functional layer was measured using a linear gauge (D-10HS, manufactured by Ozaki Mfg. Co., Ltd.).

[Haze Value]

The haze value was measured using a haze meter (NDH2000, Nippon Denshoku Industries Co., Ltd.) in accordance with JIS K7105. Here, the haze value of the optical laminate was regarded as a total haze. A value obtained by subtracting the haze value of a transparent sheet having an adhesive agent from the haze value of the optical laminate having that transparent sheet on a surface thereof having a micro-concave-convex shape, was regarded as an internal haze. Note that, as the transparent sheet having an adhesive agent, a polyethylene terephthalate film (thickness: 38 μm) on which an acrylic adhesive material (thickness: 10 μm) was applied, was used.

[Transmitted Image Clarity]

The transmitted image clarity was measured using an image clarity meter (ICM-1T, manufactured by Suga Test Instruments Co., Ltd.) in accordance with JIS K7105, where the optical comb width was 0.5 mm.

[Method for Measuring Number of Projections having Height of Not Less Than 0.1 μm]

The concave-convex shape of the outermost surface of the optical functional layer was measured by optical interferometry using a noncontact surface and layer cross-sectional shape measurement system (measuring device: VertScan R3300FL-Lite-AC, analyzing software: VertScan4, manufactured by Mitsubishi Chemical Systems, Inc.). Measured data was analyzed using analyzing software of the device. The number of projections having a height of not smaller than 0.1 μm was measured using the analyzing software.

Table 5 shows measurement and analysis conditions for the measuring system.

TABLE 5

| Conditions | Items | Settings |
|---|---|---|
| Optical conditions | Camera | Sony HR-50 1/3 |
|  | Objective lens | 10XDI |
|  | Barrel | 0.5X |
|  | Light source | 520 nm |
| Measurement conditions | Measuring device | Piezo |
|  | Measurement mode | Phase |
|  | Visual field size | 640 × 480 |
|  | Scan range | −10 to 10 μm |
|  | Average number of times | Once |
| Data processing conditions | View | 3D |
|  | Surface correction | Approximated surface shape = quartic |
|  | Interpolation | Full interpolation |

The anti-glare properties, the anti-dazzle properties, the luminance ratio, and the thickness conditions were evaluated using the following evaluation methods.

[Method and Criteria for Evaluation of Anti-Glare Properties]

The anti-glare properties were evaluated as follows. The optical laminate of each of the examples and comparative examples was attached to a black acrylic plate (SUMIPEX 960, manufactured by Sumitomo Chemical Co., Ltd.) with a transparent adhesive layer being interposed therebetween. Thereafter, one hundred randomly selected participants each visually evaluated the presence or absence of a reflection (image) of their face in the black acrylic plate under an illuminance of 250 lx by looking at the black acrylic plate from a position 50 cm away vertically from the center of the black acrylic plate. The evaluation result was indicated by an "open circle" when the number of participants who did not perceive a reflection was not less than 70, an "open triangle" when not less than 30 and less than 70, and a "cross" when less than 30.

[Method and Criteria for Evaluating Anti-Dazzle Properties]

The anti-dazzle properties were evaluated as follows. The optical laminate of each of the examples and comparative examples was attached to the screen surface of a liquid crystal monitor (iPad3 (third generation), manufactured by Apple Inc., 264 ppi, "iPad" is a registered trademark) with a transparent adhesive layer being interposed therebetween. Thereafter, the liquid crystal monitor was caused to display a green color. One hundred randomly selected participants each visually evaluated the presence or absence of dazzle in the liquid crystal monitor in a dark room by looking at the liquid crystal monitor from a position 50 cm away vertically from the center of the screen surface. The evaluation result was indicated by an "open circle" when the number of participants who did not perceive dazzle was not less than 70, an "open triangle" when not less than 30 and less than 70, and a "cross" when less than 30.

[Method and Criteria for Evaluating Luminance Ratio]

The luminance ratio was evaluated as follows. The optical laminate of each of the examples and comparative examples, or a translucent substrate, was attached to the screen surface of a liquid crystal monitor (iPad3 (third generation), manufactured by Apple Inc., 264 ppi, "iPad" is a registered trademark) with a transparent adhesive layer being interposed therebetween. Thereafter, the liquid crystal monitor was caused to display a white color. The luminance was measured in a dark room at a position 70 cm away vertically from the center of the screen surface using a spectroradiometer (SU-UL1R, manufactured by Topcon Techhouse Corporation). The evaluation results were indicated by an "open circle" when the luminance was not smaller than 95%, and a "cross" when smaller than 95%, where the luminance of the translucent substrate was 100%.

[Method and Criteria for Evaluating Thickness Conditions]

The thickness of the optical functional layer was indicated by an "open circle" when the measured value thereof was in the range of 100% to 140% of the average particle size of the resin particles, and a "cross" when the measured value thereof was not in the range of 100% to 140% of the average particle size of the resin particles.

As shown in Tables 3 and 4, the optical laminates of Examples 1 to 13 had a total haze (Y) and an internal haze (X) that satisfy all of the above conditions (1) to (4), and had a transmitted image clarity falling within the range of 15% to 55%, and the number of projections having a height of not smaller than 0.1 μm per mm² of measurement area thereof was not less than 900. Therefore, the anti-dazzle properties, anti-glare properties, and luminance ratios of the optical laminates of Examples 1 to 13 were all good.

In contrast to this, the optical laminates of Comparative examples 1 and 2 had a transmitted image clarity of greater than 55%, resulting in insufficient anti-glare properties.

In the optical laminate of Comparative example 3, colloidal silica was not blended as the first inorganic fine particles, and therefore, excessive aggregation of the resin particles was not suppressed, so that the concave-convex structure become locally rough, resulting in insufficient anti-dazzle properties.

The optical laminates of Comparative examples 4 and 5 had a thickness of greater than 140% of the average particle size of the resin particles, resulting in insufficient anti-dazzle properties.

The optical laminate of Comparative example 6 had an internal haze of smaller than 7%, resulting in insufficient anti-dazzle properties.

The optical laminates of Comparative examples 7 and 8 had an internal haze of greater than 25%, resulting in a deterioration in the luminance ratio. The optical laminates of Comparative examples 7 and 8 also had a transmitted image clarity of smaller than 15%, resulting in a deterioration in the anti-dazzle properties.

FIGS. 4A and 4B show images of concave-convex shapes on the faces of the optical functional layers of the optical laminates of Example 5 and Comparative example 5 as measured by optical interferometry using the above noncontact surface and layer cross-sectional shape measurement system. More specifically, images on the left side of FIGS. 4A and 4B are three-dimensional images of the concave-convex shapes on the surfaces of the optical functional layers, in which a darker portion has a greater roughness compared to the reference plane. Images on the right side of FIGS. 4A and 4B each show a distribution of projections having a height of not smaller than 0.1 μm at the surface of the optical functional layer, in which dark portions indicate projections having a height of not smaller than 0.1 μm. Note that FIGS. 4A and 4B correspond to Example 5 and Comparative example 5, respectively.

Comparison of the images of FIGS. 4A and 4B indicates that, as the number of projections having a height of not smaller than 0.1 μm per unit area increases, the area of each projection decreases and the distribution of the projections becomes more uniform, and that, as the number of projections having a height of not smaller than 0.1 μm per unit area decreases, the area of each projection increases, and therefore, the number of portions, in which the concave-convex shape is locally rough (dark portions in FIGS. 4A and 4B) increases. It is considered that, in the optical laminates of Examples 1 to 13, the number of projections having a height of not smaller than 0.1 μm is not less than 900 per mm² of measurement area, and therefore, the projections are uniformly distributed without being localized, resulting in an improvement in the anti-dazzle properties.

Table 6 shows the number of projections at the surface of the optical laminate for each height threshold in each of Examples 1 and 4 to 10, and 13 and Comparative examples 4, 5, and 8. Each column of Table 4 shows the number of projections formed at the surface of the optical laminate and having a height that is greater than or equal the value shown in the height threshold field, in each example.

TABLE 6

| | Height thresholds (μm) | | | | | | | | | | | | | |
|---|---|---|---|---|---|---|---|---|---|---|---|---|---|---|
| | 0.005 | 0.01 | 0.025 | 0.05 | 0.075 | 0.1 | 0.2 | 0.3 | 0.4 | 0.5 | 0.6 | 0.7 | 0.8 | 0.9 |
| Example 1 | 830 | 840 | 851 | 900 | 992 | 940 | 620 | 300 | 142 | 56 | 34 | 6 | 1 | 0 |
| Example 4 | 656 | 685 | 841 | 1044 | 1219 | 1414 | 1462 | 910 | 336 | 98 | 21 | 11 | 5 | 3 |
| Example 5 | 855 | 856 | 938 | 1015 | 1004 | 1030 | 746 | 455 | 269 | 150 | 79 | 41 | 20 | 12 |

TABLE 6-continued

| | Height thresholds (μm) | | | | | | | | | | | | | |
|---|---|---|---|---|---|---|---|---|---|---|---|---|---|---|
| | 0.005 | 0.01 | 0.025 | 0.05 | 0.075 | 0.1 | 0.2 | 0.3 | 0.4 | 0.5 | 0.6 | 0.7 | 0.8 | 0.9 |
| Example 6 | 814 | 821 | 873 | 941 | 957 | 950 | 762 | 498 | 292 | 172 | 101 | 45 | 29 | 11 |
| Example 7 | 885 | 888 | 901 | 957 | 1031 | 977 | 665 | 361 | 197 | 86 | 47 | 11 | 5 | 0 |
| Example 8 | 815 | 839 | 912 | 1107 | 1236 | 1314 | 1109 | 653 | 327 | 107 | 47 | 12 | 3 | 0 |
| Example 9 | 842 | 856 | 963 | 1090 | 1207 | 1258 | 1124 | 532 | 185 | 70 | 24 | 8 | 2 | 2 |
| Example 10 | 694 | 717 | 776 | 910 | 1007 | 1086 | 1255 | 1010 | 617 | 342 | 145 | 60 | 33 | 15 |
| Example 13 | 680 | 691 | 751 | 880 | 972 | 1040 | 1231 | 974 | 601 | 332 | 148 | 55 | 35 | 18 |
| Comparative example 4 | 730 | 734 | 711 | 811 | 824 | 858 | 643 | 467 | 312 | 185 | 118 | 68 | 29 | 21 |
| Comparative example 5 | 398 | 419 | 448 | 473 | 502 | 511 | 525 | 485 | 361 | 251 | 148 | 77 | 29 | 12 |
| Comparative example 8 | 540 | 561 | 615 | 749 | 860 | 890 | 1120 | 910 | 508 | 280 | 119 | 72 | 31 | 12 |

As shown in Table 6, in the optical laminates of Examples 1, 4 to 10, and 13, the number of projections having a height of not smaller than 0.7 μm is not greater than 60 per mm² of measurement area. In contrast to this, in the optical laminates of Comparative examples 4, 5, and 8, the number of projections having a height of not smaller than 0.7 μm is greater than 60 per mm² of measurement area. The analysis result shown in Table 4 shows that, in the optical laminates of Examples 1, 4 to 10, and 13, the projections have uniform heights, and the number of projections having a great roughness relatively decreases.

Table 7 shows an area distribution and average area of projections formed at the surface of the optical laminate of each of Examples 1, 4 to 10, and 13 and Comparative examples 4, 5, and 8. The values of the area distribution in Table 7 (e.g., the occurrence frequency of a projection having a height of not smaller than 0.1 μm, whose area falls within each area range of 100 μm²) were obtained from the areas of projections having a height of not smaller than 0.1 μm present in a predetermined reference area as measured by optical interferometry using the above noncontact surface and layer cross-sectional shape measurement system. Note that, in Table 7, "a–b" in the area range field means "not smaller than a and smaller than b." For example, the area range "0-100" means "not smaller than 0 and smaller than 100." The average areas shown in Table 7 were obtained from the areas and number of projections having a height of not smaller than 0.1 μm as measured using the above noncontact surface and layer cross-sectional shape measurement system.

As shown in Table 7, in the optical laminates of Examples 1, 4 to 10, and 13, the average area of all projections having a height of not smaller than 0.1 μm is not greater than 310 μm². In contrast to this, in the optical laminates of Comparative examples 4, 5, and 8, the average area of all projections having a height of not smaller than 0.1 μm is greater than 310 μm². The analysis result shown in Table 7 also shows that, as the number of projections having a height of not smaller than 0.1 μm per unit area increases, the average area of the projections decreases, so that the projections are uniformly distributed.

Figure 5:
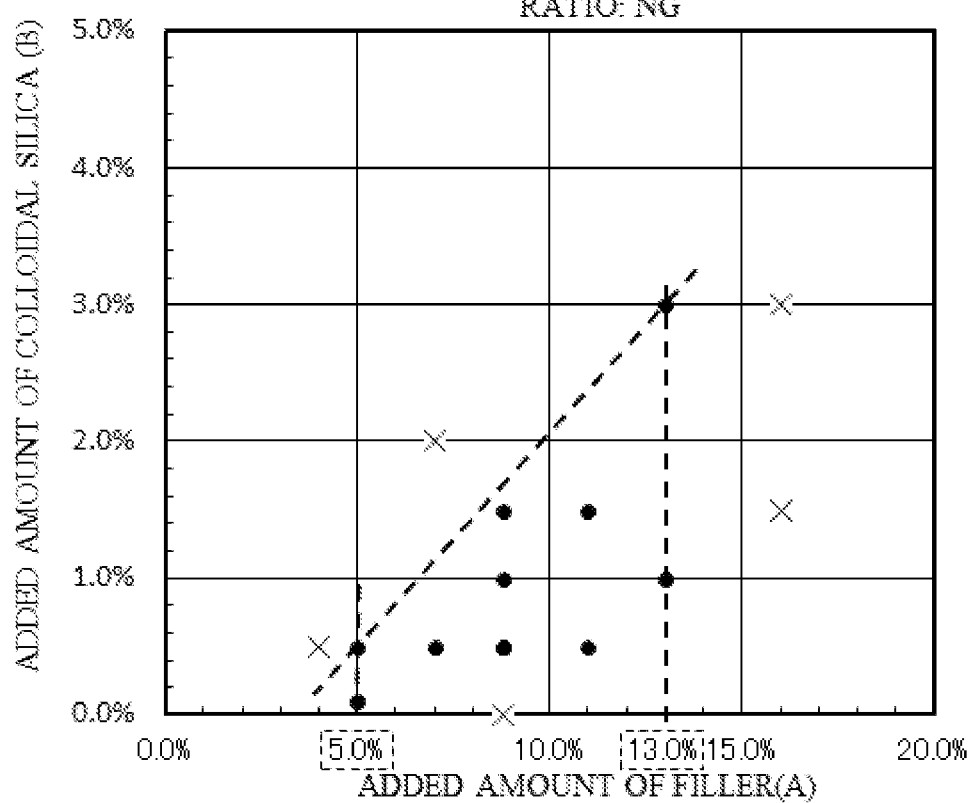
FIG. 5 is a graph in which the added amount of resin particles and the added amount of colloidal silica of each of Examples 1 to 13 and Comparative examples 1 to 3, 7, and 8 shown in Table 2 are plotted.

FIG. 5 is a graph in which the added amount of resin particles and the added amount of colloidal silica of each of Examples 1 to 13 and Comparative examples 1 to 3, 7, and 8 shown in Table 3, are plotted. In FIG. 5, the values of the examples are plotted with closed circles, and the values of the comparative examples are plotted with crosses.

As shown in FIG. 5, the plotted points indicating the added amount of resin particles and the added amount of colloidal silica of Examples 1 to 13 are all in a region that is on and below a dashed straight line (excluding the horizontal axis), and in which the added amount of resin particles is 5.0% to 13.0%. It was verified that when the optical laminates of Examples 1 to 13 were used as an anti-glare film for an image display apparatus having a high resolution of not lower than 200 ppi, the anti-dazzle properties, anti-glare properties, and contrast thereof were all excellent. Specifically, it was found that an optical laminate

TABLE 7

| | Occurrence frequency of projections having height of not smaller than 0.1 μm, whose area falls with each area range (unit of area: μm²) | | | | | | | | | | | Average area of projections (μm²) |
|---|---|---|---|---|---|---|---|---|---|---|---|---|
| | 0-100 | 100-200 | 200-300 | 300-400 | 400-500 | 500-600 | 600-700 | 700-800 | 800-900 | 900- | Total | |
| Example 1 | 666 | 121 | 53 | 26 | 11 | 7 | 4 | 3 | 0 | 49 | 940 | 191 |
| Example 4 | 1006 | 166 | 62 | 32 | 33 | 15 | 20 | 14 | 6 | 60 | 1414 | 165 |
| Example 5 | 771 | 91 | 47 | 21 | 20 | 6 | 6 | 3 | 9 | 56 | 1030 | 254 |
| Example 6 | 693 | 85 | 48 | 17 | 15 | 8 | 11 | 12 | 6 | 56 | 950 | 285 |
| Example 7 | 708 | 119 | 51 | 23 | 9 | 8 | 5 | 3 | 0 | 51 | 977 | 256 |
| Example 8 | 969 | 141 | 47 | 33 | 20 | 17 | 12 | 6 | 3 | 67 | 1314 | 201 |
| Example 9 | 891 | 151 | 59 | 27 | 24 | 27 | 8 | 8 | 3 | 60 | 1258 | 195 |
| Example 10 | 777 | 109 | 39 | 38 | 11 | 18 | 14 | 6 | 8 | 67 | 1086 | 302 |
| Example 13 | 738 | 100 | 39 | 36 | 13 | 15 | 13 | 5 | 9 | 72 | 1040 | 299 |
| Comparative example 4 | 600 | 94 | 38 | 18 | 12 | 12 | 12 | 5 | 5 | 62 | 858 | 318 |
| Comparative example 5 | 327 | 53 | 29 | 20 | 12 | 11 | 8 | 3 | 2 | 48 | 511 | 597 |
| Comparative example 8 | 560 | 125 | 57 | 31 | 9 | 15 | 11 | 5 | 6 | 71 | 890 | 370 | that simultaneously satisfies conditions (5) and (6) below simultaneously has excellent anti-dazzle properties, anti-glare properties, and contrast, where the resin particle content and colloidal silica content of the resin composition for forming an optical functional layer are represented by A (%) and B (%), respectively. The condition (5) indicates the straight line passing through the plotted points indicating the added amount of resin particles and the added amount of colloidal silica of Examples 2 and 14.

$$0 < B \leq 0.313A - 1.06 \quad (5)$$

$$5.0 \leq A \leq 13.0 \quad (6)$$

When an optical laminate did not simultaneously satisfy the conditions (5) and (6), at least one of the anti-dazzle properties, anti-glare properties, and contrast deteriorated as can be seen in Table 3, and therefore, the optical laminate was not suitable or useful as an anti-glare film for an image display apparatus having a high resolution of not lower than 200 ppi.

As described above, it was verified that even when the optical laminates of Examples 1 to 13 are used as an anti-glare film for an image display apparatus having a high resolution of not lower than 200 ppi, the optical laminates can simultaneously have excellent anti-dazzle properties, anti-glare properties, and contrast.

The optical laminate according to the present disclosure is applicable as an anti-glare film for an image display apparatus having a high resolution (e.g., not smaller than 200 ppi).

While the disclosure has been described in detail, the foregoing description is in all aspects illustrative and not restrictive. It will be understood that numerous other modifications and variations can be devised without departing from the scope of the disclosure.

What is claimed is:

1. An optical laminate comprising a translucent substrate, and at least one optical functional layer provided on the translucent substrate, wherein
    the at least one optical functional layer comprises a concave-convex shape on at least one surface thereof, and the concave-convex shape comprises projections,
    the at least one optical functional layer comprises first and second types of inorganic fine particles, and also comprises resin particles,
    the optical laminate has an internal haze X and a total haze Y satisfying the following conditions (1) to (4), $$Y > X \quad (1),$$

$$Y \leq X + 25 \quad (2),$$

$$Y \leq 50 \quad (3),$$

$$7 \leq X \leq 25 \quad (4),$$

the optical laminate has a transmitted image clarity of 15% to 55% as measured using a 0.5-mm width optical comb,
    the number of projections having a height of not smaller than 0.1 µm is not less than 900 per mm² of measurement area in the concave-convex shape as measured by optical interferometry at an outermost surface of the at least one optical functional layer, and
    the number of projections having a height of not smaller than 0.7 µm per mm² of measurement area is not greater than 60 as measured by optical interferometry at the outermost surface of the at least one optical functional layer, wherein
    an average area of all projections having a height of not smaller than 0.1 µm is not greater than 310 µm² in the concave-convex shape as measured by optical interferometry at the outermost surface of the at least one optical functional layer.

2. The optical laminate according to claim 1, wherein the first and second types of inorganic fine particles of the at least one optical functional layer comprise inorganic nanoparticles and swellable clay.

3. The optical laminate according to claim 2, wherein a content proportion A (% by mass) of the resin particles in the at least one optical functional layer and a content proportion B (% by mass) of the inorganic nanoparticles in the at least one optical functional layer satisfy the following conditions (5) and (6):

$$0 < B \leq 0.313A - 1.06 \quad (5),$$

$$5.0 \leq A \leq 13.0 \quad (6).$$

4. The optical laminate according to claim 1, wherein the at least one optical functional layer has a thickness that is 100% to 140% of an average particle size of the resin particles.

5. The optical laminate according to claim 1, wherein the at least one optical functional layer comprises at least one layer comprising a radiation curable resin composition as a main component.

6. The optical laminate according to claim 1, wherein the first and second types of inorganic fine particles of the at least one optical functional layer form an aggregate.

7. The optical laminate according to claim 1, further comprising:
    a refractive index adjustment layer, an anti-static layer, an antifouling layer, or a combination thereof.

8. A polarizer comprising the optical laminate according to claim 1, and
    a polarizing substrate provided on top of the translucent substrate of the optical laminate.

9. A display apparatus comprising the optical laminate according to claim 1.

* * * * *